(12) United States Patent
Zhang (10) Patent No.: US 9,125,156 B2
(45) Date of Patent: Sep. 1, 2015

(54) METHOD AND WI-FI DEVICE FOR SETTING COMMUNICATIONS MODE

(71) Applicant: Huawei Device Co., Ltd., Shenzen (CN)

(72) Inventor: Wei Zhang, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 89 days.

(21) Appl. No.: 13/727,368

(22) Filed: Dec. 26, 2012

(65) Prior Publication Data

US 2013/0343251 A1  Dec. 26, 2013

Related U.S. Application Data

(63) Continuation of application No. PCT/CN2012/077411, filed on Jun. 25, 2012.

(51) Int. Cl.
*H04W 52/02* (2009.01)
*H04B 7/06* (2006.01)
*H04B 7/08* (2006.01)

(52) U.S. Cl.
CPC ......... *H04W 52/0212* (2013.01); *H04B 7/0689* (2013.01); *H04B 7/0871* (2013.01); *H04W 52/028* (2013.01)

(58) Field of Classification Search
CPC ... H04L 5/0046; H04L 5/0003; H04L 5/0058; H04L 47/10; H04L 47/35; H04L 47/30; H04L 47/32
USPC .......... 370/230, 235, 329, 437, 465, 466, 467
See application file for complete search history.

(56) References Cited

U.S. PATENT DOCUMENTS

| | | | |
|---|---|---|---|
| 2005/0047046 A1 | 3/2005 | Natarajan | |
| 2005/0160181 A1* | 7/2005 | Kwon et al. | 709/238 |
| 2006/0034217 A1* | 2/2006 | Kwon et al. | 370/328 |
| 2008/0095263 A1 | 4/2008 | Xu et al. | |
| 2010/0098184 A1 | 4/2010 | Ryoo et al. | |
| 2010/0120466 A1 | 5/2010 | Li | |
| 2012/0099497 A1 | 4/2012 | Vaidya et al. | |
| 2012/0149411 A1 | 6/2012 | Miyoshi et al. | |

FOREIGN PATENT DOCUMENTS

| | | |
|---|---|---|
| CN | 1592261 A | 3/2005 |
| CN | 101252489 A | 8/2008 |
| CN | 101479980 A | 7/2009 |
| CN | 101854706 A | 10/2010 |
| CN | 102273011 A | 12/2011 |
| CN | 102457949 A | 5/2012 |

(Continued)

*Primary Examiner* — Dady Chery (74) *Attorney, Agent, or Firm* — Leydig, Voit & Mayer, Ltd.

(57) ABSTRACT

An embodiment of the present invention discloses a Wi-Fi device, including a radio frequency circuit, a signal processor, an application processor, and a Wi-Fi chip. The application processor is configured to preset the work mode of the Wi-Fi chip to a single input single output SISO mode, and is further configured to acquire a value of a parameter of an uplink wireless network, and when the value of the parameter of the uplink wireless network is determined to be greater than or equal to a preset value, set the work mode of the Wi-Fi chip to a multiple-input multiple-output MIMO mode. An embodiment of the present invention further discloses a method for setting a communications mode.

12 Claims, 7 Drawing Sheets

(56) References Cited

FOREIGN PATENT DOCUMENTS

| EP | 1838011 | A1 | 9/2007 |
| EP | 2063548 | A1 | 5/2009 |
| EP | 2444875 | A2 | 4/2012 |
| JP | 2009303029 | A | 12/2009 |

\* cited by examiner

METHOD AND WI-FI DEVICE FOR SETTING COMMUNICATIONS MODE

CROSS-REFERENCE TO RELATED APPLICATIONS

This application is a continuation of International Patent Application No. PCT/CN2012/077411, filed on Jun. 25, 2012, which is hereby incorporated by reference in their entireties.

FIELD OF THE INVENTION

The present invention relates to the field of communications technologies, and in particular to a method and a Wi-Fi device for setting a communications mode.

BACKGROUND OF THE INVENTION

With the development of the 3rd-generation (3rd-generation, 3G) mobile communications technologies and long term evolution (Long Term Evolution, LTE) technology, wireless-fidelity (Wireless-Fidelity, Wi-Fi) devices, as portable devices that allow a plurality of Wi-Fi devices to share the uplink bandwidth of an LTE network or a 3G network, are increasingly popular among users. A Wi-Fi device has an in-built LTE/3G chip and Wi-Fi chip. In the uplink, it accesses the Internet via a wireless network such as the LTE network and the 3G network. In the downlink, it provides Internet access for other Wi-Fi devices via a Wi-Fi network complying with 802.11b/g/n. Mainstream Wi-Fi devices at present generally allow 10 or more Wi-Fi devices to access the LTE network or 3G network via Wi-Fi simultaneously. These Wi-Fi devices may be notebook computers, tablets, mobile phones, and the like.

The current highest downlink rate of the LTE network is capable of reaching 150 Mbps, around 10-20 times higher than the 3G network rate. To match the high rate of the LTE network and enable Wi-Fi users to surf the Internet at a higher rate, the latest Wi-Fi devices in the industry have used the Wi-Fi multiple-input multiple-output (Multiple-Input Single-Output, MIMO) technology that may increase the maximum rate of a Wi-Fi network to more than 100 Mbps by using multi-path radio frequency and antennas.

In the prior art, the Wi-Fi work mode is set to a MIMO mode when the Wi-Fi device is started, to meet the requirement of the Wi-Fi access rate. However, the requirement of enabling a plurality of radio frequency paths in the MIMO mode results in a problem of relatively high power consumption.

SUMMARY OF THE INVENTION

Embodiments of the present invention disclose a method for setting a communications mode and a Wi-Fi device to solve the problem of relatively high power consumption of the Wi-Fi device when constructing a Wi-Fi network in a MIMO mode.

In one aspect, an embodiment of the present invention discloses a Wi-Fi device. The Wi-Fi device includes a radio frequency circuit, a signal processor, an application processor, and a Wi-Fi chip, where:

the radio frequency circuit is configured to receive and send analog signals;

the signal processor is configured to perform conversion on digital signals and analog signals;

the application processor is configured to preset a work mode of the Wi-Fi chip to a single input single output (Single Input Single Output, SISO) mode, acquire a value of a parameter of an uplink wireless network, and set the work mode of the Wi-Fi chip to a MIMO mode when the value of the parameter of the uplink wireless network is determined to be greater than or equal to a preset value; and the Wi-Fi chip supports Wi-Fi communications in the SISO mode and the MIMO mode.

In a first possible implementation manner, the parameter of the uplink wireless network is a current rate of the uplink wireless network or a current bandwidth of the uplink wireless network; and the application processor is specifically configured to acquire the current rate of the uplink wireless network, and when the current rate of the uplink wireless network is determined to be greater than or equal to a preset value, set the work mode of the Wi-Fi chip to the MIMO mode; or the application processor is specifically configured to acquire the current bandwidth of the uplink wireless network, and when the current bandwidth of the uplink wireless network is determined to be greater than or equal to a preset value, set the work mode of the Wi-Fi chip to the MIMO mode.

In a second possible implementation manner, the value of the parameter of the uplink wireless network is a current rate of the uplink wireless network and a current bandwidth of the uplink wireless network, the application processor is specifically configured to:

acquire the current rate of the uplink wireless network; and when the rate of the uplink wireless network is determined to be greater than or equal to a first value, the application processor acquires the current bandwidth of the uplink wireless network;

if the application processor determines that the current bandwidth of the uplink wireless network is greater than or equal to a second value, the application processor sets the work mode of the Wi-Fi chip to the MIMO mode;

if the application processor determines that the current bandwidth of the uplink wireless network is less than the second value, the application processor keeps the work mode of the Wi-Fi chip in the SISO mode.

In a third possible implementation manner, the value of the parameter of the uplink wireless network is a current rate of the uplink wireless network and a current bandwidth of the uplink wireless network; and the application processor is specifically configured to:

acquire the current bandwidth of the uplink wireless network, and when the current bandwidth of the uplink wireless network is determined to be greater than or equal to a third value, the application processor acquires the current rate of the uplink wireless network;

set the work mode of the Wi-Fi chip to the MIMO mode if the application processor determines that the current rate of the uplink wireless network is greater than or equal to a fourth value;

keep the Wi-Fi chip in the SISO mode if the application processor determines that the current rate of the uplink wireless network is less than the fourth value.

In combination with the preceding first to third implementation methods, according to a fourth possible implementation manner, after the application processor sets the Wi-Fi mode of the Wi-Fi device to the MIMO mode, the application processor is further configured to acquire the current rate of the uplink wireless network; and if the application processor determines that the current rate of the uplink wireless network is less than a fifth value, the application processor sets the work mode of the Wi-Fi chip to the SISO mode.

In combination with the preceding first to fourth possible implementation manners, according to a fifth possible implementation manner, the presetting a Wi-Fi mode of the Wi-Fi device to the SISO mode includes that:

the application processor determines the network standard of the accessed network, and judges whether the network rate of the accessed network is capable of reaching a sixth value according to the network standard; and if the network rate is capable of reaching the sixth value, the application processor presets the work mode of the Wi-Fi chip to the SISO mode; otherwise, the work mode of the Wi-Fi chip is set to the SISO mode and the process is terminated.

In combination with the preceding first to fifth possible implementation manners, according to a sixth possible implementation manner, the presetting the Wi-Fi mode of the Wi-Fi device to the SISO mode includes that:

the application processor determines the highest defined network rate in the Internet access package of the Wi-Fi device, and if the application processor determines that the highest network rate is greater than or equal to a seventh value, the application processor presets the work mode of the Wi-Fi chip to the SISO mode; otherwise, the work mode of the Wi-Fi chip is set to the SISO mode and the process is terminated.

In another aspect, an embodiment of the present invention discloses a method for setting a communications mode, applied to a Wi-Fi device that supports Wi-Fi communications in a SISO mode and a MIMO mode, and including:

presetting a Wi-Fi mode of the Wi-Fi device to the SISO mode;

acquiring a value of a parameter of an uplink wireless network; and setting the Wi-Fi mode of the Wi-Fi device to the MIMO mode if the value of the parameter of the uplink wireless network is greater than or equal to a preset value.

In a first possible implementation manner, the parameter of the uplink wireless network is a current rate of the uplink wireless network or a current bandwidth of the uplink wireless network.

In a second possible implementation manner, the value of the parameter of the uplink wireless network is a current rate of the uplink wireless network and a current bandwidth of the uplink wireless network; and the acquiring a value of a parameter of an uplink wireless network and setting the Wi-Fi mode of the Wi-Fi device to the MIMO mode if the value of the parameter of the uplink wireless network is greater than or equal to a preset value include:

acquiring the current rate of the uplink wireless network;

acquiring the current bandwidth of the uplink wireless network if the current rate of the uplink wireless network is greater than or equal to a first value;

setting the Wi-Fi mode of the Wi-Fi device to the MIMO mode if the current bandwidth of the uplink wireless network is greater than or equal to a second value;

keeping the Wi-Fi mode in the SISO mode if the current bandwidth of the uplink wireless network is less than the second value.

In a third possible implementation manner, the value of the parameter of the uplink wireless network is a current rate of the uplink wireless network and a current bandwidth of the uplink wireless network; and the acquiring a value of a parameter of an uplink wireless network and setting the Wi-Fi mode of the Wi-Fi device to the MIMO mode if the value of the parameter of the uplink wireless network is greater than or equal to a preset value includes:

acquiring the current bandwidth of the uplink wireless network;

acquiring the current rate of the uplink wireless network if the current bandwidth of the uplink wireless network is greater than or equal to a third value;

setting the Wi-Fi mode of the Wi-Fi device to the MIMO mode if the current rate of the uplink wireless network is greater than or equal to a fourth value;

keeping the Wi-Fi mode in the SISO mode if the current rate of the uplink wireless network is less than the fourth value.

In combination with the preceding first to third possible implementation manners, according to a fourth possible implementation manner, after the setting the Wi-Fi mode of the Wi-Fi device to the MIMO mode, the method further includes:

acquiring the current rate of the uplink wireless network; and setting the Wi-Fi mode of the Wi-Fi device to the SISO mode if the current rate of the uplink wireless network is less than a fifth value.

In combination with the preceding first to fourth possible implementation manners, according to a fifth possible implementation manner, the presetting a Wi-Fi mode of the Wi-Fi device to the SISO mode includes that:

the Wi-Fi device determines the network standard of the accessed network, and determines whether the rate of the accessed network is capable of reaching a sixth value based on the network standard, and if the network rate is capable of reaching the sixth value, the Wi-Fi mode of the Wi-Fi device is preset to the SISO mode; otherwise, the Wi-Fi mode is set to the SISO mode and the process is terminated.

In combination with the preceding first to fifth possible implementation manners, according to a sixth possible implementation manner, the presetting a Wi-Fi mode of the Wi-Fi device to the SISO mode includes that:

the Wi-Fi device determines the highest defined network rate in the Internet access package of the Wi-Fi device, and if the highest network rate is greater than or equal to a seventh value, the Wi-Fi mode of the Wi-Fi device is preset to the SISO mode; otherwise, the Wi-Fi mode is set to the SISO mode and the process is terminated.

By applying the method for setting a communications mode and the Wi-Fi device disclosed in the embodiments of the present invention, the Wi-Fi mode of the Wi-Fi device is preset to the SISO mode after the Wi-Fi device is started; if the uplink wireless network meets the preset conditions, the Wi-Fi mode of the Wi-Fi device is switched to the MIMO mode. In this way, when the uplink wireless network has poor quality, the problem of relatively high power consumption of the device caused by enabling the MIMO mode is prevented, and the battery life is extended.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description illustrate some embodiments of the present invention, and a person of ordinary skill in the art may derive other accompanying drawings from these accompanying drawings without creative efforts.

DETAILED DESCRIPTION OF THE EMBODIMENTS

In order to make the objectives, technical solutions, and advantages of the present invention more comprehensible, specific embodiments of the present invention are further described below with reference to the accompanying drawings. Apparently, the embodiments described below are a part rather than all of the embodiments of the present invention. All other embodiments acquired by a person of ordinary skill in the art based on the embodiments of the present invention without creative efforts shall fall within the protection scope of the present invention.

First of all, it should be noted that the Wi-Fi device described in the embodiments of the present invention includes but are not limited to terminal devices such as mobile phones, tablet computers, notebook computers, mobile 3G/LTE routers. A person skilled in the art can understand that a device, which is capable of accessing a 3G network or an LTE network and is capable of working as a relay hotspot to construct a Wi-Fi network for other user devices to access by using the network bandwidth of the accessed 3G network or LTE network, can be used as the Wi-Fi device to implement the present invention. The 3G network and LTE network are only two examples, and a device that supports other wireless networks can also be used as the Wi-Fi device to implement the present invention. The device is not limited in the present invention. In addition, the uplink wireless network described in the embodiments of the present invention refers to a wireless wide area network, such as the 3G network and the LTE network, accessed by the Wi-Fi device by using the information of a user card connected to the Wi-Fi device, such as a SIM card and a USIM card. The downlink network described in the embodiments of the present invention refers to a Wi-Fi network constructed by the Wi-Fi device as a hotspot via the uplink wireless network accessed by the Wi-Fi device.

Figure 1:
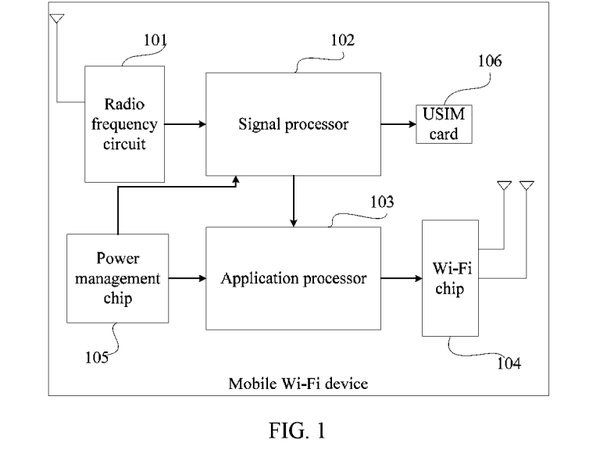
FIG. 1 is a schematic structural diagram of a Wi-Fi device according to an embodiment of the present invention.

As shown in FIG. 1, an embodiment of the present invention provides a Wi-Fi device, including a radio frequency circuit 101, a signal processor 102, an application processor 103, and a Wi-Fi chip 104.

The radio frequency circuit 101 is configured to receive and send analog signals.

The radio frequency circuit 101 may include an antenna, configured to receive and send analog signals, where the analog signals may also be called baseband signals; may further include a power amplifier, configured to amplify analog signal power before sending an analog signal; and may further include a filter, a mixer, and the like. Optionally, in the embodiments of the present invention, the radio frequency circuit 101 can be specifically configured to receive analog signals that contain the current bandwidth of the uplink wireless network, and transmit the analog signals that contain the current bandwidth of the uplink wireless network to the signal processor 102.

The signal processor 102 is configured to implement the conversion and encoding and decoding of digital signals and analog signals.

The signal processor 102 may specifically be a digital signal processor (Digital Signal Processor, DSP), and is capable of implementing digital-to-analog conversion of signals and accomplishing encoding and decoding of signals and channels. All analog signals sent and received by the radio frequency circuit need to be processed by the signal processor 102. For example, before the Wi-Fi device sends signals to a base station, the digital signals generated by the Wi-Fi device need to be converted to analog signals, encoded, and encrypted by the signal processor 102, and then sent out by the radio frequency circuit 101. When the Wi-Fi device receives signals from the base station, the signals from the base station need to be converted to digital signals and decoded by the signal processor 102. Optionally, in the embodiments of the present invention, the signal processor 102 can be specifically configured to convert and decode signals that contain the current bandwidth of the uplink wireless network, acquire a value of the current bandwidth of the uplink wireless network, and transmit the value to the application processor 103.

The application processor 103 is configured to control the work mode of the Wi-Fi chip, preset the work mode of the Wi-Fi chip to a SISO mode, and acquire a value of a parameter of an uplink wireless network. The value of the parameter of the uplink wireless network may be the current rate of the wireless network or the current bandwidth of the uplink wireless network. The work mode of the Wi-Fi chip is set to a MIMO mode when the value of the parameter of the uplink wireless network is greater than or equal to a preset value.

The application processor 103, which may be a micro control unit (Micro Control Unit, MCU) based on an ARM architecture, controls the Wi-Fi chip by computer commands such as the AT commands. Before starting a Wi-Fi device and accessing an uplink wireless network, the work mode of the Wi-Fi chip is set to the SISO mode first, then one or a plurality of antennas and Wi-Fi radio frequency circuits are disabled. The work mode of a Wi-Fi chip is preset to the SISO mode because the data throughput rate of a Wi-Fi network is low when the Wi-Fi device is just started. Therefore, compared with the existing method for presetting the Wi-Fi mode to the MIMO mode right after the device is started, presetting the Wi-Fi mode to the SISO mode may effectively reduce the power consumption of the Wi-Fi device without affecting the Wi-Fi network rate. After the Wi-Fi device is started, the application processor 103 may also acquire the value of the parameter of the uplink wireless network and adjust the work mode of the Wi-Fi chip according to the value of the parameter of the uplink wireless network. The value of the parameter of the uplink wireless network includes either or both of the current rate of the uplink wireless network and the current bandwidth of the uplink wireless network.

The embodiments of the present invention provide different solutions for acquiring the current rate of the uplink wireless network and the current bandwidth of the uplink wireless network. Optionally, in the solutions that the application processor 103 acquires the current rate of the uplink wireless network, the application processor 103 detects the real-time rate of the uplink wireless network of the Wi-Fi device according to real-time signals and data traffic received by the radio frequency circuit 101 and the signal processor 102. Optionally, in the solutions that the application processor 103 acquires the current bandwidth of the uplink wireless network, the application processor 103 may send air interface signaling to a base station or network server through the radio frequency circuit 101 and the signal processor, requesting the base station or network server to send the value of the current bandwidth that can be assigned by the uplink wireless network to the Wi-Fi device, or the base station or the network server may also actively send and broadcast the bandwidth value that the uplink wireless network may assign to the Wi-Fi device. In this way, the application processor 103 acquires the current bandwidth of the uplink wireless network.

The Wi-Fi chip 104 supports Wi-Fi communications in the SISO mode and the MIMO mode. The Wi-Fi chip 104 supports the construction of the downlink Wi-Fi network by using the bandwidth of the uplink wireless network. As shown in FIG. 1, the Wi-Fi chip 104 may include two antennas and two Wi-Fi radio frequency circuits to achieve the 2×2 MIMO mode; the Wi-Fi chip 104 may further include four antennas and four Wi-Fi radio frequency circuits to achieve the 4×4 MIMO mode; the Wi-Fi chip 104 may also be other MIMO modes with a plurality of inputs and outputs. Drawings and part of the embodiments of the present invention are illustrated by using the 2×2 MIMO mode as an example, but this does not limit the present invention. The switching of the work mode of the Wi-Fi chip 104 is controlled by the application processor 103.

Optionally, the Wi-Fi device further includes a power management chip 105 that is configured to supply power for the radio frequency circuit 101, the signal processor 102, the application processor 103 and the Wi-Fi chip 104. Certainly, other manners can also be used for the radio frequency circuit 101, the signal processor 102, the application processor 103, and the Wi-Fi chip 104. The Wi-Fi device further includes a Universal Subscriber Identity Module (Universal Subscriber Identity Module, USIM) card 106.

In the foregoing embodiment, the value of the parameter of the uplink wireless network may be the current rate of the uplink wireless network or the current bandwidth of the uplink wireless network. In an example of an embodiment of the present invention, the application processor 103 may acquire the current rate of the uplink wireless network, and adjust the work mode of the Wi-Fi chip 104 according to the current rate of the uplink wireless network. For example, the preset value of the rate of the uplink wireless network is used as a first value, and the first value is 25 Mbps. According to the foregoing solutions, the application processor 103 acquires the value of the current rate of the uplink wireless network in real time, and compares the current rate of the uplink wireless network with the first value. If the current rate of the uplink wireless network is greater than or equal to 25 Mbps, the work mode of the Wi-Fi chip 104 is set to the MIMO mode to meet the requirement on the Wi-Fi network rate; if the current rate of the uplink wireless network is less than 25 Mbps, the operation of switching the work mode of the Wi-Fi chip 104 is not executed, and the Wi-Fi chip 104 stays in the SISO mode to reduce the power consumption of the Wi-Fi device.

In another example of an embodiment of the present invention, the application processor 103 may acquire the current bandwidth of the uplink wireless network, and adjust the work mode of the Wi-Fi chip 104 according to the current bandwidth of the uplink wireless network. For example, the preset value of the bandwidth of the uplink wireless network is used as a second value, and the second value is 35 Mbps. According to the foregoing solutions, the application processor 103 acquires the value of the current bandwidth of the uplink wireless network, and compares the current bandwidth of the uplink wireless network with the second value. If the current bandwidth of the uplink wireless network is greater than or equal to 35 Mbps, the work mode of the Wi-Fi chip 104 is set to the MIMO mode, because if the bandwidth of the uplink wireless network is capable of reaching a certain value at this time, the data throughput rate of the Wi-Fi network may also reach a large value. If the work mode of the Wi-Fi chip is set to the MIMO mode, it may better meet the requirement on the network rate of the Wi-Fi network. If the bandwidth of the uplink wireless network is less than 25 Mbps, the operation of switching the work mode of the Wi-Fi chip 104 is not executed, and the Wi-Fi chip 104 stays in the SISO mode, because the bandwidth directly affects the network rate. If the bandwidth is low, it is impossible to achieve high-rate wireless data transmission even if the requirement on the network rate of the Wi-Fi network is high. Therefore, it is unnecessary for the Wi-Fi chip 104 to work in the MIMO mode.

Optionally, in an embodiment of the present invention, an application processor 103 acquires the current rate of the uplink wireless network, and then, after the current rate of the uplink wireless network is determined to be greater than or equal to a first value, and before the work mode of the Wi-Fi chip is set to a MIMO mode, the application processor 103 further acquires the current bandwidth of the uplink wireless network, and determines whether the acquired current bandwidth of the uplink wireless network is greater than or equal to a second value, for example, 35 Mbps. If the current bandwidth of the uplink wireless network is greater than or equal to the second value, the work mode of the Wi-Fi chip is set to the MIMO mode; if the current bandwidth of the uplink wireless network is less than the second value, the work mode of the Wi-Fi chip stays in the SISO mode instead of being set to the MIMO mode. In this way, the switching of the work mode of the Wi-Fi chip can be ensured in the situation where the requirement on the network rate is relatively high and the bandwidth is high enough, and power waste caused by switching the work mode of the Wi-Fi chip to the MIMO mode when the bandwidth is not high enough is avoided.

Optionally, in another embodiment of the present invention, an application processor 103 acquires the current bandwidth of an uplink wireless network. After the current bandwidth of the uplink wireless network is determined to be greater than or equal to a third value, for example, 40 Mbps, and before the work mode of a Wi-Fi chip is set to a MIMO mode, the application processor 103 acquires the current rate of the uplink wireless network, and determines whether the current rate of the uplink wireless network acquired is greater than or equal to a fourth value, for example, 30 Mbps. If the current bandwidth of the uplink wireless network is greater than or equal to the fourth value, the work mode of the Wi-Fi chip is set to the MIMO mode; if the current rate of the uplink wireless network is less than the fourth value, the work mode of the Wi-Fi chip is not set to the MIMO mode but stays in the SISO mode. In this way, the switching of the work mode of the Wi-Fi chip can be ensured in the situation where the requirement on the network rate is high enough and the bandwidth is high enough, and power waste caused by switching the work mode of the Wi-Fi chip to MIMO mode when the bandwidth is not high enough is avoided.

In the foregoing embodiments, after the application processor 103 sets the work mode of the Wi-Fi chip to the MIMO mode, the application processor 103 may also extract the current rate of the uplink wireless network in the work process in real time or at an interval, or randomly acquires the current rate of the uplink wireless network. If the current rate of the uplink wireless network is less than a fifth value, for example, 30 Mbps, a user terminal can be considered to have lowered its requirement on the network rate at this time, and the application processor switches the work mode of the Wi-Fi chip to the SISO mode, so that the Wi-Fi device works in the SISO mode when the user terminal accessing the Wi-Fi network does not have a high requirement on the network rate, thereby reducing power consumption.

In the embodiments of the present invention, a plurality of manners is provided for an application processor 103 to set the work mode of a Wi-Fi chip 104 to a SISO mode. One optional manner is that after a Wi-Fi device is started and finishes Internet access scanning, the Wi-Fi device selects a proper network standard according to factors such as the initial network configuration of the Wi-Fi device (for example, if the device is set to 3G Only, only 3G networks can be used), the availability of the networks in the current location of the device (for example, only 3G or 2G networks are available in some areas), the network priority, or the like. Different network standards differ in the highest rate they are capable of reaching, for example, an LTE network is capable of reaching a rate of 150 Mbps, a common High Speed Packet Access (High Speed Packet Access, HSPA) network is capable of reaching a rate of 14.4 Mbps, while a Wideband Code Division Multiple Access (Wideband Code Division Multiple Access, WCDMA) network may only reach a rate of 384 Kbps. Therefore, according to the standard of the network that is accessed by the Wi-Fi device, it can be determined whether the application processor 103 needs to detect the value of the parameter of the uplink wireless network so as to switch the work mode of the Wi-Fi chip 104 in the subsequent process. If the application processor 103 determines that the network rate of the network accessed by the Wi-Fi device is capable of reaching a sixth value, for example, 35 Mbps, the application processor 103 presets the work mode of the Wi-Fi chip to the SISO mode, and in the Internet access process, the application processor 103 executes the solutions of detecting the value of the parameter of the uplink wireless network and switching the work mode of the Wi-Fi chip 104. If the application processor 103 determines that the network rate of the network accessed by the Wi-Fi device is incapable of reaching the sixth value, for example, if the network accessed by the Wi-Fi device is a WCDMA network, the application processor 103 sets the work mode of the Wi-Fi chip 104 to the SISO mode, and as long as the network standard remains unchanged in the subsequent Internet access process, the application processor 103 neither needs to detect, determine or judge the value of the parameter of the uplink wireless network, nor needs to switch the work mode of the Wi-Fi chip 104. Therefore, if the network accessed by the Wi-Fi device is incapable of reaching the network rate defined by the sixth value, the work mode of the Wi-Fi chip 104 stays in the SISO mode to reduce power consumption.

Another optional manner is that when a Wi-Fi device has accessed a network and performs the process of dialing up to access the Internet, the Wi-Fi device may acquire information of the Internet access package used by the Internet access account of the Wi-Fi device through signaling exchange between the Wi-Fi device and a network server or a base station. The application processor 103 may determine the highest network rate defined in the Internet access package according to the information of the Internet access package. If the highest network rate defined in the package is greater than or equal to a seventh value, for example, 35 Mbps, the application processor 103 presets the work mode of the Wi-Fi chip 104 to the SISO mode, and in the Internet access process, the application processor 103 executes the solutions of detecting the value of the parameter of the uplink wireless network and switching the work mode of the Wi-Fi chip 104. If the application processor 103 determines that the highest network rate defined in the package is less than the seventh value, the application processor 103 sets the work mode of the Wi-Fi chip 104 to the SISO mode. In the subsequent Internet access process, as long as the uplink wireless network and the Internet access account remain unchanged, the application processor 103 neither needs to detect, determine or judge the value of the parameter of the uplink wireless network, nor needs to switch the work mode of the Wi-Fi chip 104. Therefore, if the highest network rate of the Internet access account of the network accessed by the Wi-Fi device cannot reach the network rate defined by the seventh value, the work mode of the Wi-Fi chip 104 stays in the SISO mode to reduce power consumption.

Furthermore, a Wi-Fi device may determine whether to execute the subsequent switching operation for the standard of the accessed network during Internet access scanning, and then determine whether to execute the subsequent switching operation according to the information of the Internet access package during Internet dial-up access. For a detailed process, refer to the following detailed descriptions of the embodiments.

It should be noted that the first value, the second value, the third value, the fourth value, the fifth value, the sixth value and the seventh value are exemplary names. These values may be equal or unequal, which is not limited in the present invention.

It should also be noted that the radio frequency circuit 101 and the signal processor 102 in the embodiments of the present invention may be implemented by using an independent chip, baseband chips that are integrated together, or functional modules integrated in the baseband chips. The application processor 103 may be a micro processor and may also be integrated to a baseband chip with the signal processor 102 or the radio frequency circuit 101. Each hardware part in the embodiments of the present invention can be combined into a hardware entity or change correspondingly and be divided into a plurality of hardware entities or structures.

In the embodiments of the present invention, the Wi-Fi mode of the Wi-Fi device is preset to the SISO mode when the Wi-Fi device is started, and if the uplink wireless network meets the preset conditions; the Wi-Fi mode of the Wi-Fi device is switched to the MIMO mode. In this way, when the uplink wireless network has poor quality, the problem of relatively high power consumption of the device caused by enabling the MIMO mode is avoided, and the battery life is extended.

Figure 2:
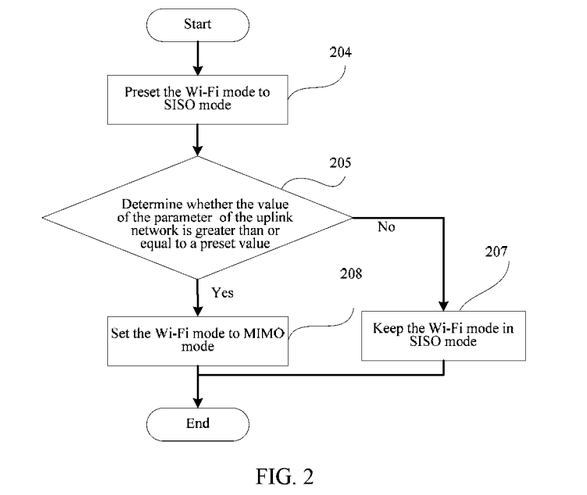
FIG. 2 is a schematic flow chart of a method for setting a communications mode according to an embodiment of the present invention.

As shown in FIG. 2, an embodiment of the present invention further provides a method for setting a communications mode. The method includes:

Step 204: Preset the Wi-Fi mode of a Wi-Fi device to a SISO mode.

When the Wi-Fi device is started and accesses an uplink wireless network, the work mode of a Wi-Fi chip is set to the SISO mode first, and one or more antennas and Wi-Fi radio frequency circuits are disabled; when the switching of the Wi-Fi mode is needed later, the SISO mode can be switched to a MIMO mode. In most cases, the data throughput rate of a Wi-Fi network is not high when the Wi-Fi device is just started. Therefore, compared with the existing method for presetting the Wi-Fi mode to the MIMO mode right after the device is started, presetting the Wi-Fi mode to the SISO mode may effectively reduce the power consumption of the Wi-Fi device without affecting the Wi-Fi network rate.

Step 205: Acquire a value of a parameter of an uplink wireless network and determine whether the value of the parameter of the uplink wireless network is greater than or equal to a preset value.

The value of the parameter of the uplink wireless network includes either or both of the current rate of the uplink wireless network and the current bandwidth of the uplink wireless network. The Wi-Fi device may detect the real-time rate of the uplink wireless network according to the signals received in real time and the data traffic. The Wi-Fi device may send air interface signaling to a base station or a network server, requesting the base station or network server to send a value of the current bandwidth that can be assigned to the Wi-Fi device by the uplink wireless network; the base station or network server may actively send and broadcast the value of the bandwidth that can be assigned to the Wi-Fi device. In this way, the current bandwidth of the uplink wireless network can be acquired.

Step 208: If the value of the parameter of the uplink wireless network is greater than or equal to the preset value, the Wi-Fi mode of the Wi-Fi device is set to the MIMO mode.

Step 207: If the value of the parameter of the uplink wireless network is less than the preset value, the Wi-Fi mode stays in the SISO mode.

In this embodiment, the Wi-Fi mode of the Wi-Fi device is preset to the SISO mode after the Wi-Fi device is started, if the uplink wireless network satisfies the preset conditions, the Wi-Fi mode of the Wi-Fi device is then set to the MIMO mode. In this way, when the uplink wireless network has poor quality, the problem of relatively high power consumption of the device caused by enabling the MIMO mode is avoided, and the battery life is extended.

Optionally, in an example of an embodiment of the present invention, the current rate of the uplink wireless network can be acquired and the Wi-Fi mode is adjusted according to the current rate of the uplink wireless network. For example, the preset value of the rate of the uplink wireless network is used as a first value, and the first value is 25 Mbps. According to the foregoing solutions, the Wi-Fi device acquires the value of the current rate of the uplink wireless network in real time and compares the current rate of the uplink wireless network with the first value. If the current rate of the uplink wireless network is greater than or equal to 25 Mbps, the Wi-Fi mode is set to the MIMO mode to meet the requirement on the Wi-Fi network rate; if the current rate of the uplink wireless network is less than 25 Mbps, the operation of switching the Wi-Fi mode is not executed, and the Wi-Fi mode stays in the SISO mode to reduce the power consumption of the Wi-Fi device.

In another example of an embodiment of the present invention, the current bandwidth of the uplink wireless network can be acquired and the Wi-Fi mode can be adjusted according to the current bandwidth of the uplink wireless network. For example, the preset value of the rate of the uplink wireless network is used as a third value, and the third value is 35 Mbps. According to the foregoing solutions, the Wi-Fi device acquires the value of the bandwidth of the uplink wireless network in real time, and compares the value of the bandwidth of the uplink wireless network with the third value. If the bandwidth of the uplink wireless network is greater than or equal to 35 Mbps, the Wi-Fi mode is set to the MIMO mode, because if the bandwidth of the uplink wireless network is capable of reaching a specified value, the data throughput rate of the Wi-Fi network may also reach a large value. Therefore, setting the Wi-Fi mode to the MIMO mode may better satisfy the requirement on the network rate of the Wi-Fi network. If the bandwidth of the uplink wireless network is less than 25 Mbps, the operation of switching the Wi-Fi mode is not executed and the Wi-Fi mode stays in the SISO mode, because the bandwidth directly affects the network rate; if the bandwidth is low, it is impossible to achieve high rate wireless data transmission even if the requirement on the rate of the Wi-Fi network is high. Therefore, it is unnecessary for the Wi-Fi device to work in the MIMO mode.

Figure 3:
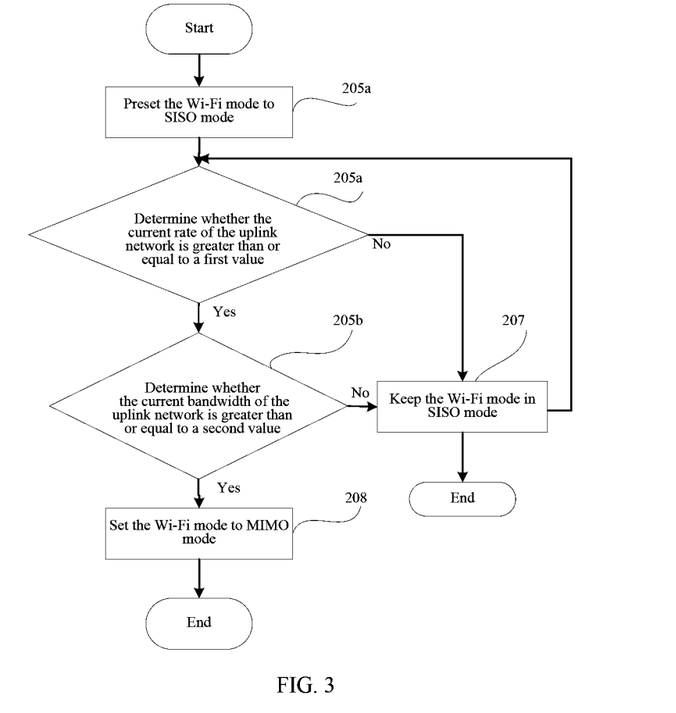
FIG. 3 is a schematic flow chart of another method for setting a communications mode according to an embodiment of the present invention.

Optionally, as shown in FIG. 3, an embodiment of the present invention further provides another method for setting a communications mode, including:

Step 204: Preset the Wi-Fi mode of a Wi-Fi device to a SISO mode.

Step 205a: Acquire the current rate of the uplink wireless network and determine whether the current rate of the uplink wireless network is greater than or equal to a first value. If the current rate of the uplink wireless network is determined to be greater than or equal to the first value, go to step 205b; if the current rate of the uplink wireless network is determined to be less than the first value, go to step 207.

Step 205b: Acquire the current bandwidth of the uplink wireless network and determine whether the current bandwidth of the uplink wireless network is greater than or equal to a second value. If the current bandwidth of the uplink wireless network is determined to be greater than or equal to the second value, go to step 208; if the current bandwidth of the uplink wireless network is determined to be less than the second value, go to step 207.

Step 208: Set the Wi-Fi mode of the Wi-Fi device to a MIMO mode.

Step 207: Keep the Wi-Fi mode in the SISO mode.

By implementing the foregoing embodiments, when the requirement on the Wi-Fi network rate is relatively high, the switching of the work mode of the Wi-Fi chip is ensured when the bandwidth is high enough, and power waste caused by switching the work mode of the Wi-Fi chip to the MIMO mode when the bandwidth is not high enough is avoided.

Figure 4:
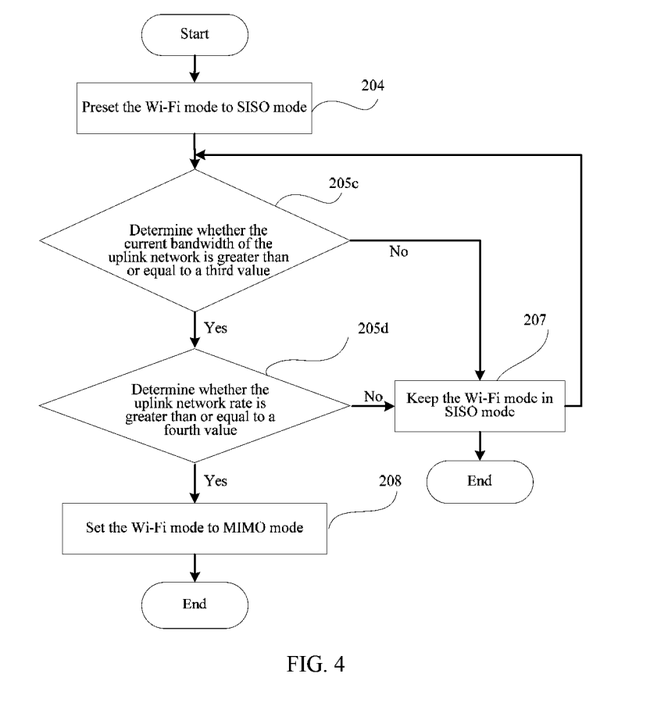
FIG. 4 is a schematic flow chart of another method for setting a communications mode according to an embodiment of the present invention.

Optionally, as shown in FIG. 4, an embodiment of the present invention further provides another method for setting a communications mode. The method includes:

Step 204: Preset the Wi-Fi mode of a Wi-Fi device to a SISO mode.

Step 205c: Acquire the current bandwidth of the uplink wireless network and determine whether the current bandwidth of the uplink wireless network is greater than or equal to a third value. If the current bandwidth of the uplink wireless network is determined to be greater than or equal to the third value, go to step 205a; if the current bandwidth of the uplink wireless network is determined to be less than the third value, go to step 207.

Step 205d: Acquire the current rate of the uplink wireless network and determine whether the current rate of the uplink wireless network is greater than or equal to a fourth value. If the current rate of the uplink wireless network is determined to be greater than or equal to the fourth value, go to step 208; if the current rate of the uplink wireless network is determined to be less than the fourth value, go to step 207.

Step 208: Set the Wi-Fi mode of the Wi-Fi device to the MIMO mode.

Step 207: Keep the Wi-Fi mode in the SISO mode.

By implementing the foregoing embodiments, the switching of the work mode of the Wi-Fi chip is ensured to be achieved when the bandwidth is high enough and the requirement on the network rate is relatively high, and power waste caused by switching the work mode of the Wi-Fi chip to MIMO mode when the requirement on the network rate is low is avoided.

Figure 5:
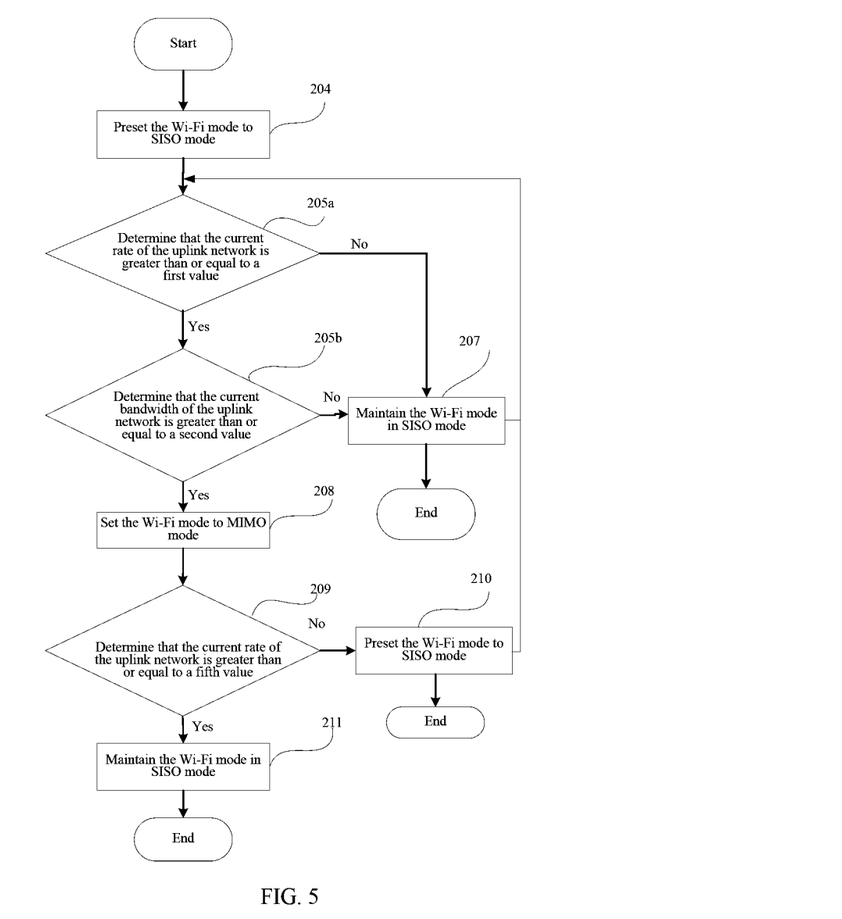
FIG. 5 is a schematic flow chart of another method for setting a communications mode according to an embodiment of the present invention.

Optionally, as shown in FIG. 5, based on the foregoing embodiments, the method further includes the following after the Wi-Fi mode is set to the MIMO mode:

Step 209: Acquire the current rate of the uplink wireless network and determine whether the current rate of the uplink wireless network is greater than or equal to a fifth value. If the current rate of the uplink wireless network is less than the fifth value, go to step 210; if the current rate of the uplink wireless network is greater than or equal to the fifth value, go to step 211.

Step 210: Set the Wi-Fi mode to the SISO mode. After step 210, either go to step 205c or terminate the process.

Step 211: Keep the Wi-Fi mode in the MIMO mode.

The Wi-Fi device may extract the current rate of the uplink wireless network during the work process in real time or at an interval, or randomly acquire the current rate of the uplink wireless network, that is to say, step 209 may happen at any time after step 208 and before the Wi-Fi device stops working. If the current rate of the uplink wireless network is less than the fifth value, for example, 30 Mbps, the requirement for network rate of the user terminal may be considered to have been lowered, and the Wi-Fi device switches the Wi-Fi mode to the SISO mode, so that the Wi-Fi device works in the SISO mode when the user terminal accessing the Wi-Fi network does not have a high requirement on the network rate, thereby reducing power consumption.

Figure 6:
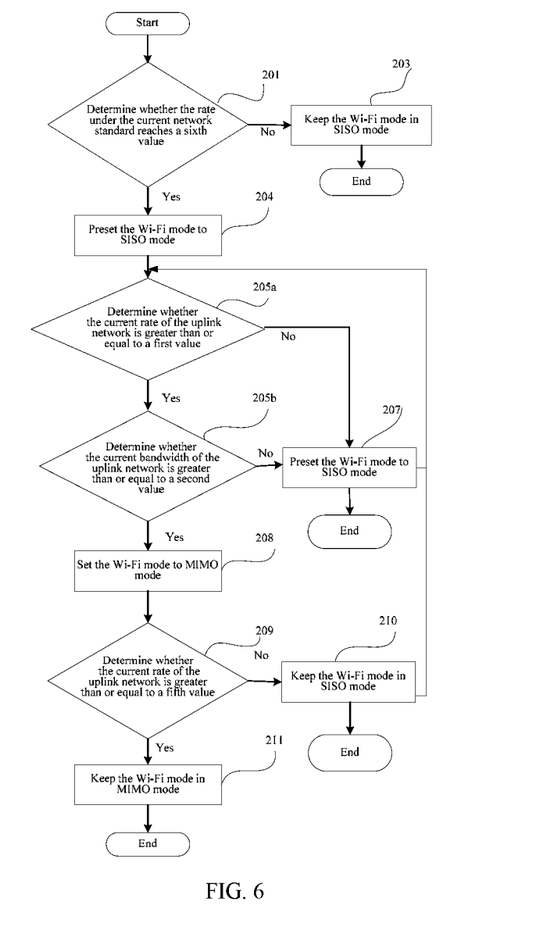
FIG. 6 is a schematic flow chart of another method for setting a communications mode according to an embodiment of the present invention.

Optionally, as shown in FIG. 6, based on the foregoing embodiments, the method may further include the following before step 204:

Step 201: Determine whether the network rate under the current network standard is capable of reaching a sixth value. If the network rate is capable of reaching the sixth value, go to step 204; if the network rate is incapable of reaching the sixth value, go to step 203.

Step 203: Set the Wi-Fi mode to the SISO mode.

After the Wi-Fi device is started and finishes Internet access scanning, the Wi-Fi device selects a proper network standard according to factors such as the initial network configuration of the Wi-Fi device (for example, if the device is set to 3G Only, only 3G networks can be used), the availability of the networks in the current location of the device (for example, only 3G or 2G networks is available in some areas), or the network priority, and the like. Different network standards differ in the highest rate they are capable of reaching, for example, an LTE network is capable of reaching a rate of 150 Mbps, a common High Speed Packet Access (High Speed Packet Access, HSPA) network is capable of reaching a rate of 14.4 Mbps, while a Wideband Code Division Multiple Access (Wideband Code Division Multiple Access, WCDMA) network may only reach a rate of 384 Kbps. Therefore, according to the network standard of the network accessed by the Wi-Fi device, it can be determined whether it is necessary 3 to perform detection on the value of the parameter of the uplink wireless network to switch the Wi-Fi mode in the subsequent process. If the rate of the network accessed by the Wi-Fi device is determined and is capable of reaching the six value, for example, 35 Mbps, the Wi-Fi mode is preset to the SISO mode, and in the Internet access process, the Wi-Fi device executes the solutions of detecting the value of the parameter of the uplink wireless network and switching the Wi-Fi mode; if the value of the parameter of the uplink wireless network is determined and is incapable of reaching the sixth value, for example, if the Wi-Fi device accesses a WCDMA network, the Wi-Fi mode is set to the SISO mode. In the subsequent Internet access process, as long as the network standard does not change, the Wi-Fi device does not have to detect, determine or judge the value of the parameter of the uplink wireless network, nor switch the Wi-Fi mode. Therefore, if the network accessed by the Wi-Fi device is incapable of reaching the network rate defined by the sixth value, the Wi-Fi mode stays in the SISO mode to reduce power consumption.

Figure 7:
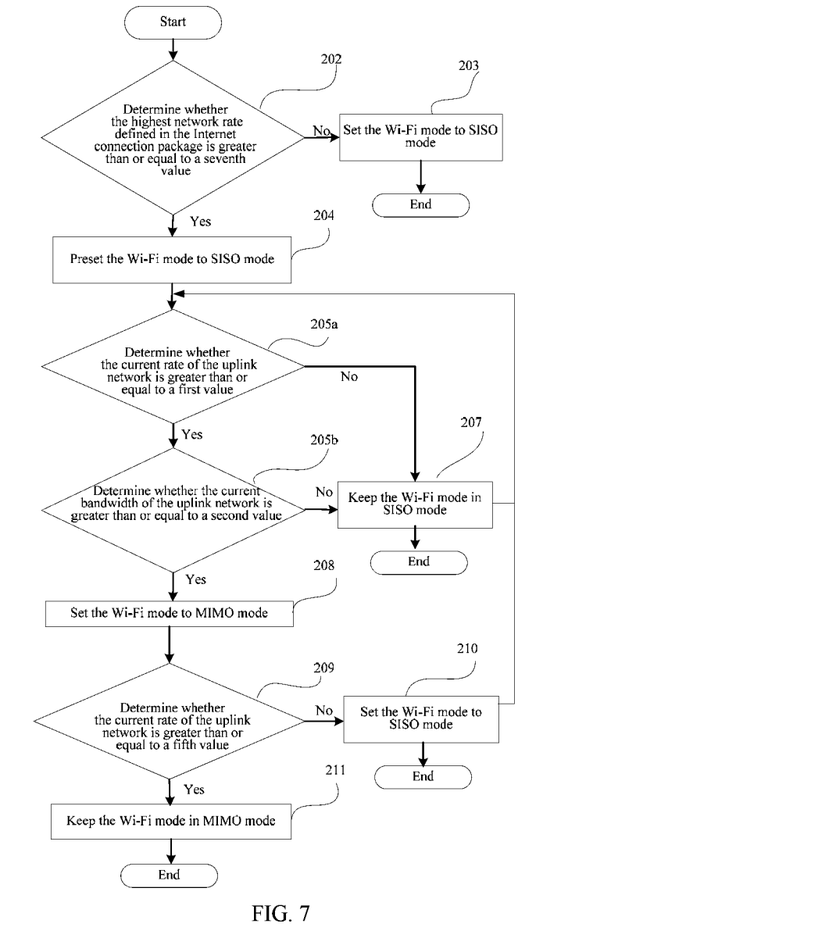
FIG. 7 is a schematic flow chart of another method for setting a communications mode according to an embodiment of the present invention.

Optionally, as shown in FIG. 7, based on the foregoing embodiments, the method may further include the following before step 204:

Step 202: Determine whether the highest network rate defined in the Internet access package is greater than or equal to a seventh value. If the highest network rate is greater than or equal to the seventh value, go to step 204; if the highest network rate is less than the sixth value, go to step 203.

Step 203: Set the Wi-Fi mode to the SISO mode.

If the Wi-Fi device has accessed a network and performs the process of dialing up to access the Internet, the Wi-Fi device may acquire information of the Internet access package used by the Internet access account of the Wi-Fi device through signaling exchange between the Wi-Fi device and a network server or base station, and the Wi-Fi device may determine the highest network rate defined in the Internet access package according to the information of the Internet access package. If the highest network rate defined in the package is greater than the seventh value, for example, 35 Mbps, the Wi-Fi device presets the Wi-Fi mode to the SISO mode, and executes the solutions of detecting the value of the parameter of the uplink wireless network and switching the Wi-Fi mode; if the application processor 103 determines that the highest network rate defined in the package is less than the seventh value, the Wi-Fi device sets the Wi-Fi mode to the SISO mode. As long as the uplink wireless network and the Internet access account remains unchanged in the subsequent Internet access process, it is unnecessary to detect, determine, or judge the value of the parameter of the uplink wireless network, nor to switch the Wi-Fi mode. Therefore, if the highest network rate of the Internet access account of the network accessed by the Wi-Fi device is incapable of reaching the network rate defined by the seventh value, the Wi-Fi mode stays in the SISO mode to reduce power consumption.

Figure 8:
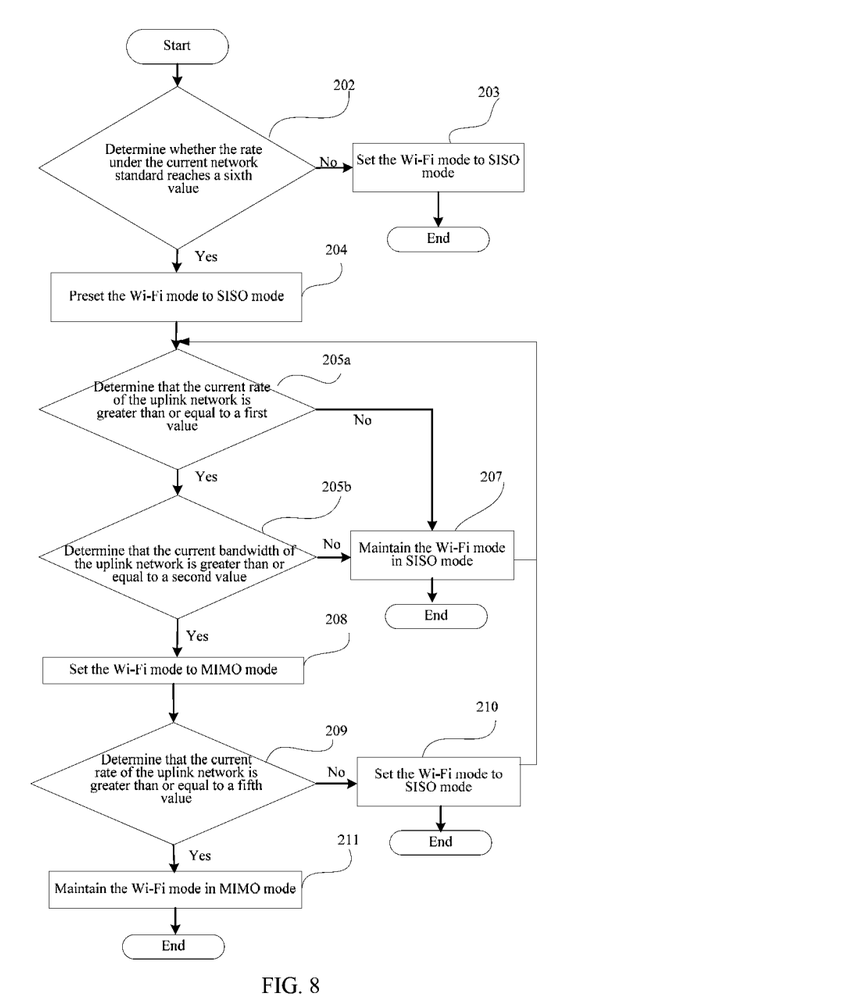
FIG. 8 is a schematic flow chart of another method for setting a communications mode according to an embodiment of the present invention.

Optionally, as shown in FIG. 8, before step 204, step 201 may be executed: if the network rate is capable of reaching the sixth value, go to step 202, and if the highest network rate in the package is greater than or equal to the seventh value, go to step 204. Detailed operations are not further described here.

In the foregoing embodiments, descriptions of each embodiment have their own focuses. For non-detailed parts of an embodiment, reference may be made to related descriptions in other embodiments.

A person skilled in the art can understand that an accompanying drawing is only a schematic diagram of an exemplary embodiment, modules, entities or processes in the accompanying drawings are optional to implement the present invention.

According to the descriptions about the embodiments, a person skilled in the art may be fully aware that the present invention may be implemented by using software plus a necessary generic hardware platform, and definitely may also be implemented by using hardware, but in most cases, the present invention is preferably implemented by using the former manner. Based on such understanding, the technical solutions of the present invention may be substantially or the part that contributes to the prior art may be embodied in the form of a software product. The computer software product may be stored in a readable storage medium, for example, a floppy disk, a hard disk, or a compact disk of a computer, and incorporate several instructions to enable a computer device (for example, a personal computer, a server, or a network device) to perform the method described in each of the embodiments of the present invention.

The foregoing embodiments are only provided for describing the technical solutions of the present invention, but not intended to limit the present invention. It should be understood by a person of ordinary skill in the art that although the present invention are described in detail with reference to the embodiments, modifications may be made to the technical solutions described in each of the embodiments, or equivalent replacements may be made to some technical features in the technical solutions, as long as such modifications or replacements do not cause the essence of corresponding technical solutions to depart from the spirit and scope of the technical solutions in each of the embodiments of the present invention.

What is claimed is:

1. A Wi-Fi device, comprising:
 a Wi-Fi chip supporting Wi-Fi communication with a Single Input Single Output (SISO) mode and a Multiple Input Multiple output (MIMO) mode;
 a non-transitory memory for storing computer instructions;
 a processor configured to execute the computer instructions to perform the following:
 presetting a work mode of the Wi-Fi chip to the SISO mode;
 obtaining one or more values of: a value of a current rate of an uplink wireless network, and a value of a current bandwidth of the uplink wireless network;
 determining that the obtained one or more values meet a preset condition;
 based upon the determining, switching the work mode of the Wi-Fi chip from the SISO mode to the MIMO mode;
 determining that a current rate of the uplink wireless network is less than a preset fifth value; and,
 based upon the determining switching the work mode of the Wi-Fi chip from the MIMO mode to the SISO mode.

2. The Wi-Fi device according to claim 1, wherein the determining that the obtained one or more values meet the preset condition comprises:
 determining that the current rate of the uplink wireless network is greater than or equal to a first value; and
 based upon the determining, determining that the current bandwidth of the uplink wireless network is greater than or equal to a second value.

3. The Wi-Fi device according to claim 1, wherein the determining that the obtained one or more values meet the preset condition comprises:
 determining that the current bandwidth of the uplink wireless network is greater than or equal to a third value; and
 based upon the determining, determining that the current rate of the uplink wireless network is greater than or equal to a fourth value.

4. The Wi-Fi device according to claim 1, wherein the presetting the work mode of the Wi-Fi chip to the SISO mode further comprises:
 determining a network standard of an accessed network;
 determining whether a network rate of the accessed network is capable of reaching a sixth value according to the network standard;
 wherein if the network rate is capable of reaching the sixth value, presetting the work mode of the Wi-Fi chip to the SISO mode; and
 if the network rate is not capable of reaching the sixth value, setting the work mode of the Wi-Fi chip to the SISO mode and terminating the process of setting the work mode of the Wi-Fi chip to the SISO mode.

5. The Wi-Fi device according to claim 1, wherein the presetting the work mode of the Wi-Fi chip to the SISO mode further comprises:
 determining a highest network rate which is defined in an internet access package of the Wi-Fi device;
 wherein if the determining that the highest network rate is greater than or equal to a seventh value, presetting the work mode of the Wi-Fi chip to the SISO mode; and
 if the determining that the highest network rate is less than the seventh value, setting the work mode of the Wi-Fi chip to the SISO mode and terminating the process of setting the work mode of the Wi-Fi chip to the SISO mode.

6. The Wi-Fi device according to claim 1, wherein the determining that the obtained one or more values meet the preset condition comprises:
 determining that the value of the current bandwidth of the uplink wireless network is greater than or equal to a preset value.

7. The Wi-Fi device according to claim 1, wherein the determining that the obtained one or more values meet the preset condition comprises:
 determining that the value of the current rate of the uplink wireless network is greater than or equal to a preset value.

8. A method for setting a communications mode, applied to a Wi-Fi device that supports Wi-Fi communications in a single input single output (SISO) mode and a multiple-input multiple-output (MIMO) mode, the method comprising:
 presetting, by the Wi-Fi device, a Wi-Fi mode of the Wi-Fi device to the SISO mode;
 obtaining, by the Wi-Fi device, one or more values of: a value of a current rate of an uplink wireless network, and a value of a current bandwidth of the uplink wireless network; d
 determining, by the Wi-Fi device, that the obtained one or more values meet a preset condition;
 based upon the determining, by the Wi-Fi device, switching the Wi-Fi mode of the Wi-Fi device from the SISO mode to the MIMO mode;
 determining, by the Wi-Fi device, that a current rate of the uplink wireless network is less than a preset fifth value; and
 based upon the determining, switching, by the Wi-Fi device, the Wi-Fi mode of the Wi-Fi device from the MIMO mode to the SISO mode.

9. The method according to claim 8, wherein the determining that the obtained one or more values meet the preset condition comprises:
 determining that the current rate of the uplink wireless network is greater than or equal to a first value; and
 based upon the determining, determining that the current bandwidth of the uplink wireless network is greater than or equal to a second value.

10. The method according to claim 8, wherein the determining that the obtained one or more values meet the preset condition comprises:
 determining that the current bandwidth of the uplink wireless network is greater than or equal to a third value; and
 based upon the determining, determining that the current rate of the uplink wireless network is greater than or equal to a fourth value.

11. The method according to claim 8, wherein the presetting the Wi-Fi mode of the Wi-Fi device to the SISO mode comprises:
 determining, by the Wi-Fi device, a network standard of an accessed network;

determining whether the rate of the accessed network is capable of reaching a sixth value according to the network standard;

wherein if the network rate is capable of reaching the sixth value, the Wi-Fi mode of the Wi-Fi device is preset to the SISO mode; and if the network rate is not capable of reaching the sixth value, the Wi-Fi mode of the Wi-Fi device is set to the SISO mode and the process of presetting the Wi-Fi mode of the Wi-Fi device to the SISO mode is terminated.

12. The method according to claim 8, wherein the presetting the Wi-Fi mode of the Wi-Fi device to the SISO mode comprises:

determining, by the Wi-Fi device, a highest network rate which is defined in the internet access package of the Wi-Fi device;

wherein if the highest network rate is greater than or equal to a seventh value, the Wi-Fi mode of the Wi-Fi device is preset to the SISO mode; and if the highest network rate is less than the seventh value, the Wi-Fi mode of the Wi-Fi device is set to the SISO mode and the process of presetting the Wi-Fi mode of the Wi-Fi device to the SISO mode is terminated.

* * * * *

UNITED STATES PATENT AND TRADEMARK OFFICE
CERTIFICATE OF CORRECTION

Page 1 of 1

PATENT NO. : 9,125,156 B2
APPLICATION NO. : 13/727368
DATED : September 1, 2015
INVENTOR(S) : Wei Zhang It is certified that error appears in the above-identified patent and that said Letters Patent is hereby corrected as shown below:

In the Claims

Column 15, line 36, "determining switching" should read -- determining, switching --.

Column 16, line 35, "network; d" should read -- network; --.

Signed and Sealed this
Sixteenth Day of February, 2016

Michelle K. Lee
*Director of the United States Patent and Trademark Office*